United States Patent [19]

Riegel et al.

[11] 4,119,705
[45] Oct. 10, 1978

[54] PRODUCTION OF CHLORINE

[75] Inventors: Herbert Riegel, Maplewood; Vincent A. Strangio, Glen Ridge, both of N.J.

[73] Assignee: The Lummus Company, Bloomfield, N.J.

[21] Appl. No.: 785,286

[22] Filed: Apr. 6, 1977

[51] Int. Cl.² .............................................. C01B 7/04
[52] U.S. Cl. .................................... 423/507; 423/488
[58] Field of Search ........................ 423/500, 502, 507

[56] References Cited

U.S. PATENT DOCUMENTS

| | | | |
|---|---|---|---|
| 2,299,427 | 10/1942 | Rosenstein | 423/502 |
| 2,312,952 | 3/1943 | Balcar | 423/502 |
| 2,418,930 | 4/1947 | Gorin | 423/507 |
| 2,418,931 | 4/1947 | Gorin | 423/502 |
| 2,448,255 | 8/1948 | De Benedictis et al. | 423/502 X |
| 2,542,961 | 2/1951 | Johnson et al. | 423/502 |
| 2,547,928 | 4/1951 | Davis et al. | 423/502 |
| 3,210,158 | 10/1965 | Engel et al. | 423/502 |
| 3,534,562 | 10/1970 | Thijssen | 423/500 X |
| 3,816,599 | 6/1974 | Kafes | 423/502 X |
| 3,919,406 | 11/1975 | Grimes et al. | 423/500 X |
| 3,968,200 | 7/1976 | Tsao | 423/502 X |

*Primary Examiner*—Earl C. Thomas
*Attorney, Agent, or Firm*—Marn & Jangarathis

[57] ABSTRACT

Hydrogen chloride and oxygen are contacted with a molten mixture of cuprous and cupric chloride in a oxidation reaction zone to enrich the cupric chloride content of the melt, and the melt introduced into a dechlorination zone wherein gaseous chlorine is removed from the melt. The oxidation reactor is operated at a pressure higher than the dechlorination reactor, and molten salt circulation rates are controlled in a manner such that the cupric chloride content and temperature of the salt introduced into the dechlorination reaction zone are higher than the cupric chloride concentration and temperature of the melt introduced into the oxidation reactor.

12 Claims, 1 Drawing Figure

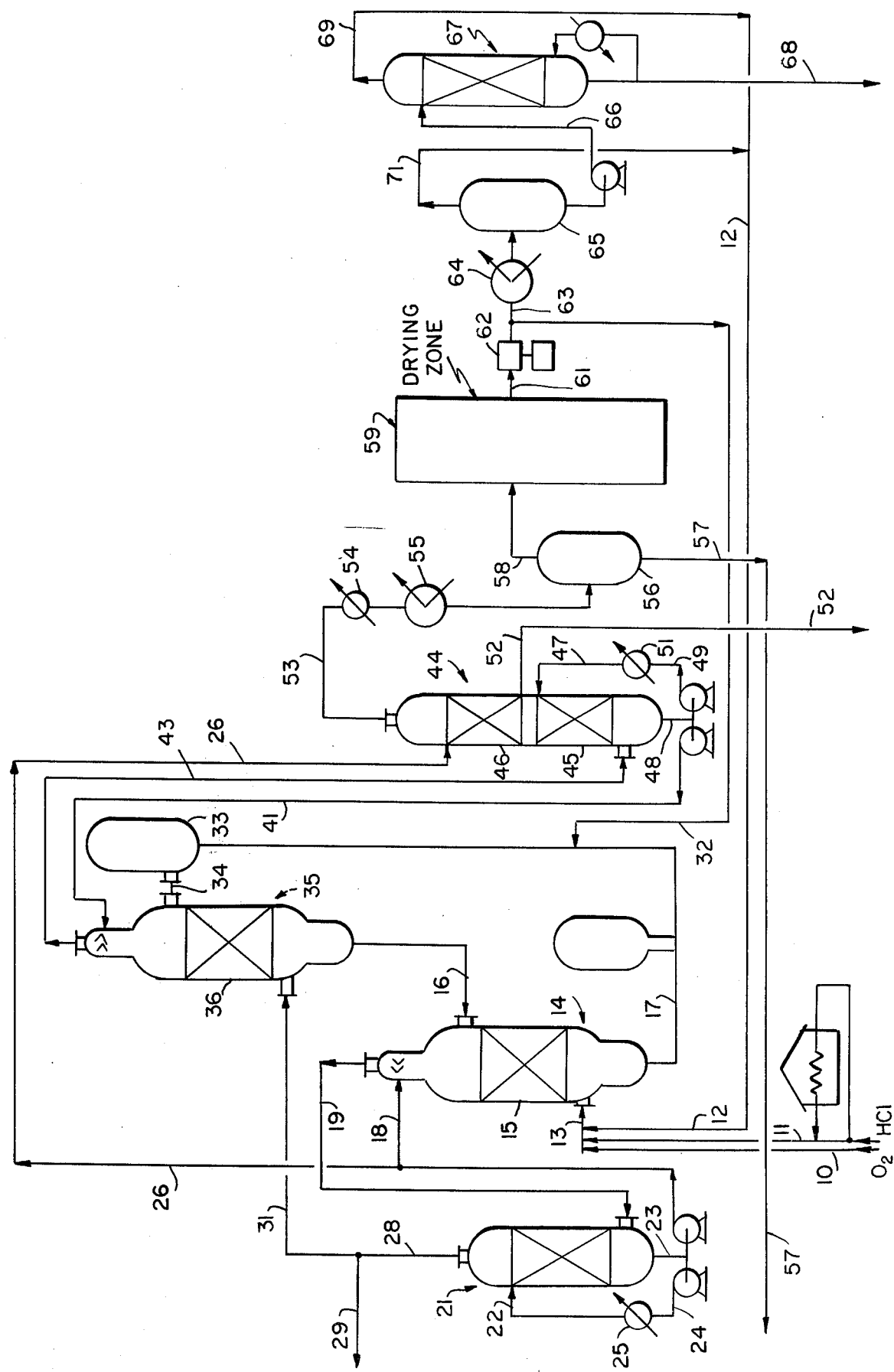

PRODUCTION OF CHLORINE

This invention relates to the oxidation of chlorine to hydrogen chloride, and more particularly, to a process for oxidizing hydrogen chloride to chlorine by the use of molten copper chlorides.

In accordance with one aspect of the present invention, there is provided a process for producing chlorine by the oxidation of hydrogen chloride (the so-called Deacon reaction) by the use of a molten salt mixture containing cuprous and cupric chloride wherein oxygen and hydrogen chloride are contacted in a first reaction zone (oxidation reaction zone) with the molten salt mixture containing cuprous and cupric chloride to enrich the cupric chloride content of the molten salt, followed by introduction of the cupric chloride enriched molten salt mixture into a second reaction zone (dechlorination reaction zone) to recover chlorine values from the molten salt, as gaseous chlorine, and thereby reduce the cupric chloride content of the molten salt mixture, with the conditions in the first and second reaction zones being controlled to achieve high chlorine yields.

More particularly, the conditions in the oxidation reaction zone and the dechlorination reaction zone are controlled in the manner such that the oxidation reaction zone is operated at a pressure which is higher than the pressure of the dechlorination reaction zone, and in a manner such that the salt inlet temperature to the oxidation reaction zone is lower than the salt inlet temperature to the dechlorination reaction zone.

The oxidation reaction zone is generally operated at a pressure of from 1 to 10 atm., and preferably at a pressure of from 4 to 6 atm. The salt inlet temperature to the oxidation reaction zone is generally from 780° F to 880° F, and preferably from 820° F to 870° F. The cupric chloride concentration of the salt introduced into the oxidation reaction zone is at a value to provide a cupric chloride to total copper mole ratio of from 0.5:1 to 0.65:1, and preferably of from 0.55:1 to 0.62:1.

The dechlorination reaction zone is generally operated at a pressure of from 0.1 to 2 atm., and preferably a pressure of from 1 to 1.5 atm. The salt inlet temperature to the dechlorination reaction zone is generally from 840° F to 1000° F, and preferably from 930° F to 970° F. The cupric chloride concentration of the salt introduced into the dechlorination reaction zone is at a value to provide a cupric chloride to total copper mole ratio of from 0.55:1 to 0.75:1, and preferably of from 0.65:1 to 0.73:1.

In accordance with the present invention, the operating pressure of the oxidation reaction zone is at least 1 atm. greater than the operating pressure of the dechlorination reaction zone, with the pressure of the oxidation reactor generally being in the order of from 3 to 5 atm. greater than the pressure of the dechlorination reactor. The salt inlet temperature to the oxidation reactor is generally at least 60° F less than the inlet temperature to the dechlorination reactor, with the salt inlet temperature to the oxidation reactor generally being from 80° to 120° F less than the salt inlet temperature to the dechlorination reactor. Similarly, the cupric chloride concentration of the salt introduced into the dechlorination reactor is generally at least 5% greater than the cupric chloride concentration of the salt introduced into the oxidation reactor, with the cupric chloride concentration generally being in the order of from 8 to 15% greater than the cupric chloride concentration of the salt introduced into the oxidation reactor.

The change in temperature and cupric chloride concentration between the oxidation and dechlorination reactors can be achieved, without the use of heat exchange apparatus, by controlling the salt circulation rate. In general, the salt circulation rate is in the order of from 1.5 to 5.0 tons salt/lbs. mol $Cl_2$ prod. and preferably of from 2.5 to 3.5 tons salt/lbs. mol $Cl_2$ prod.

In accordance with the present invention, it is possible to achieve high chlorine yields based on hydrogen chloride feed. In general, it is possible to achieve chlorine yields in the order of from 96 to 98%, based on hydrogen chloride, without the necessity of recovering and recycling hydrogen chloride present in the gaseous effluent withdrawn from the oxidation reactor.

The molten salt is a mixture of cuprous and cupric chloride, with the molten salt further containing a melting point depressant which is nonvolatile and resistant to the action of oxygen under the process conditions. The melting point depressant is generally a metal chloride having only one positive valent state, with such metal chloride preferably being alkali metal chlorides, such as potassium and lithium chloride in particular, but it is to be understood that other metal chlorides and mixtures thereof such as the heavy metal chlorides; i.e., heavier than copper, of Groups I, II, III and IV of the Periodic Table; for example, zinc, silver and thallium chloride, can also be used. The melting point depressant is generally added to the salt mixture in an amount sufficient to adjust the melting point of the mixture to a temperature of below 750° F, and in the case of a salt mixture of copper chlorides and potassium chloride, the composition of the melt generally ranges from about 20 to about 40%, preferably about 30%, by weight, potassium chloride, with the remainder being copper chlorides. The molten salt mixture may also include other additives and promoters. In particular, the molten salt mixture may include a chloride of a rare earth metal, preferably lanthanum chloride, with such rare earth metal chlorides, if employed, being present in an amount of from 5 to 20%, by weight.

In accordance with another aspect of the present invention, there is provided an improved overall process for producing chlorine by the oxidation of hydrogen chloride wherein unoxidized hydrogen chloride is recovered as concentrated aqueous hydrogen chloride.

The present invention will be further described with respect to the accompanying drawing, wherein:

The drawing is a simplified schematic flow diagram of an embodiment of the present invention.

It is to be understood, however, that the scope of the present invention is not to be limited by the hereinafter described specific embodiment.

Referring now to the drawing, an oxygen-containing gas, such as air or oxygen in line 10, hydrogen chloride in line 11 and a recycle stream, containing oxygen and chlorine in line 12, obtained as hereinafter described, is combined in line 13 and introduced into an oxidation reactor generally indicated as 14, containing means for increasing gas-liquid contact, such as a packed bed, schematically indicated as 15. A molten salt mixture containing cupric and cuprous chloride, and further including a melting point depressant, in particular, potassium chloride, is introduced into reactor 14 through line 16 to countercurrently contact the gaseous mixture introduced into the reactor through line 13. The reactor 14 is operated at the conditions hereinabove described, and as a result of the countercurrent contact between the molten salt mixture and the gas introduced through line 13, the hydrogen chloride is oxidized to chlorine, and such chlorine values are recovered by the molten salt by enriching the cupric chloride content of such molten salt.

A molten salt mixture, enriched in cupric chloride, is withdrawn from reactor 14 through line 17 for further processing to recover chlorine values therefrom, as hereinafter described.

A gaseous effluent, containing unreacted oxygen, inerts, such as nitrogen introduced with the oxygen containing gas, equilibrium amounts of hydrogen chloride and some chlorine is contacted in the upper portion of reactor 14 with an aqueous hydrogen chloride quench liquid introduced into the top of the reactor through line 18 to effect cooling of the effluent, with such cooling also resulting in vaporization of the quench liquid. In general, the effluent is cooled to a temperature in the order of from about 835° F to about 450° F as a result of such quenching.

A partially cooled gaseous effluent, containing oxygen, nitrogen, hydrogen chloride, chlorine and water vapor is withdrawn from reactor 14 through line 19 and introduced into a quench cooling tower, schematically indicated as 21. In quench cooling tower 21, the gas is directly contacted with an aqueous hydrogen chloride quench liquid introduced into the top of the tower through line 22 to separate hydrogen chloride from the gas and recover the hydrogen chloride as an aqueous hydrogen chloride solution.

A dilute aqueous hydrogen chloride solution, generally containing from 8 to about 20%, by weight, of hydrogen chloride is withdrawn from tower 21 through line 23 and a first portion thereof is passed through line 24 including a cooler 25 for subsequent introduction into the quench tower 21 through line 22. A further portion of the aqueous hydrogen chloride is employed as a quench liquid in line 18 for cooling the gaseous effluent in the top of oxidation reactor 14. A further portion of the aqueous hydrogen chloride is employed in line 26 for quenching, as hereinafter described.

A gaseous effluent, essentially free of hydrogen chloride, and containing oxygen, nitrogen, chlorine and water vapor is withdrawn from quench tower 21 through line 28 and a first portion thereof passed through line 29 for purging from the system subsequent to effecting neutralization thereof with a suitable caustic (not shown).

The remaining portion of the gaseous effluent withdrawn from the quench tower 21 is passed through line 31 for subsequent introduction into a dechlorination reactor for effecting stripping of chlorine values from the molten salt, as hereinafter described.

The molten salt, enriched in cupric chloride, in line 17 is lifted by a suitable lift gas in line 32 into a separation vessel, schematically indicated as 33 for separation of the molten salt from the lift gas.

The separated molten salt and lift gas is passed from separation vessel 33 through line 34 and introduced into a dechlorination reactor, schematically indicated as 35 and containing means for increasing gas-liquid contact, such as a packed bed, schematically indicated as 36. The dechlorination reactor 35 is operated at the conditions hereinabove described. The molten salt, enriched in cupric chloride, is countercurrently contacted in dechlorination reactor 35 with a stripping gas in line 31, obtained as hereinabove described. As a result of such contact, chlorine values are stripped from the melt as gaseous chlorine thereby reducing the cupric chloride content of the molten salt.

As particularly shown, the dechlorination reactor 35 is positioned at a height greater than the height of the oxidation reactor 14, whereby molten salt can be passed from the dechlorination reactor to the oxidation reactor by gravity. It is to be understood, however, that the reactors may be maintained at the same levels, whereby the molten salt can be transported by the use of a lift gas. As particularly shown, the molten salt, now reduced in its cupric chloride content, is passed from the dechlorination reactor 35 through line 16 for introduction into the oxidation reactor 14.

The gaseous stream is cooled in the top of reactor 35 by an aqueous hydrogen chloride quench liquid introduced into the top of the reactor through line 41, and obtained as hereinafter described, resulting in vaporization of the quench liquid. The gaseous effluent including the vaporized quench liquid and lift gas withdrawn from the lift gas separator 33, is withdrawn through line 43 and introduced into a quench cooling tower 44. The gaseous stream in line 43 contains the chlorine product stripped from the molten salt, the stripping gas introduced through line 31 and the lift gas.

The quench tower 44 contains two vapor liquid contacting beds 45 and 46, with the gas introduced through line 43 being quenched cooled in the lower bed 45 by an aqueous hydrogen chloride quench liquid introduced into the top of the bed through line 47 and further cooled in bed 46 by dilute aqueous hydrogen chloride introduced into the top of the bed 46 through line 26, with such aqueous hydrogen chloride quench liquid being obtained from the quench tower 21 for the oxidizer 14. The contacting in the upper bed 46 also results in stripping of water from the aqueous hydrogen chloride quench liquid introduced through line 26 to provide a more concentrated aqueous hydrogen chloride solution.

As a result of the direct quench cooling in bed 45, an aqueous hydrogen chloride stream is condensed from the gas introduced through line 43, with such aqueous hydrogen chloride stream being withdrawn from the lower bed 45 through line 48. A first portion of the aqueous hydrogen chloride stream is passed through line 41 to be employed as the quench liquid for the upper portion of the dechlorination reactor 35. A second portion of such aqueous hydrogen chloride stream is passed through line 49, including a cooler 51, and employed as the aqueous hydrogen chloride quench liquid for the lower bed 45 introduced through line 47. In the upper bed 46 of the quench tower 44, the gas is cooled and also effects stripping of water from the dilute aqueous hydrogen chloride stream introduced through line 26. A more concentrated aqueous hydrogen chloride stream is withdrawn from the bottom of the upper bed 46 through line 52, with such aqueous hydrogen chloride stream having a hydrogen chloride concentration in the order of from about 17 to about 21%, and most preferably about 21 wt. % hydrogen chloride.

A gaseous stream, containing chlorine product, and in addition oxygen, nitrogen, water vapor and some minor amounts of hydrogen chloride, is withdrawn from the quench tower 44 through line 53 and cooled in coolers 54 and 55 to effect condensation of aqueous hydrogen chloride therefrom. The stream is introduced into a vapor-liquid separator 56, with the aqueous hydrogen chloride stream being withdrawn from separator 56 through line 57 as a waste water stream.

The gaseous stream withdrawn from separator 56 through line 58 is essentially free of hydrogen chloride and such stream is then dried in a drying zone 59 by procedures known in the art, with such drying preferably being effected by direct contact with sulfuric acid. The dried gas is withdrawn from drying zone 59 through line 61 and is then compressed in a compressor 62 with a portion of the compressed gas being employed as the lift gas in line 32. The remaining portion of the gaseous stream in line 63 is passed through a cooler 64 to effect cooling of the gas to a temperature at which a major portion of the chlorine product is liquefied, with the combined liquid-gas stream being introduced into a gas-liquid separator 65. In general, the gaseous stream is cooled to a temperature in the order of from about −40° F to about 40° F, at a pressure in the order of from about 4 to about 20 atm., to effect the condensation of liquid chlorine.

The liquid chlorine stream withdrawn from separator 65 through line 66 is introduced into a stripper 67 to strip any absorbed oxygen therefrom, with the liquid chlorine product being recovered, as bottoms, from stripper 67 through line 68.

Striped oxygen is withdrawn as overhead from stripper 67 through line 69, combined with the oxygen rich vapor withdrawn from separator 65 through line 71, and the combined stream recycled to the oxidizer through line 12.

The hereinabove described embodiment may be modified within the spirit and scope of the present invention. Thus, for example, the aqueous hydrogen chloride recovered in line 52 may be recycled to the oxidation reactor in order to effect conversion of the hydrogen chloride to chlorine. The use of such recycle, however, would increase the heat requirements for the process and, accordingly, such recycle may not be economically justified.

The above modification and others should be apparent to those skilled in the art from the teachings herein.

The invention will be further described with respect to the following example; however, the scope of the invention is not to be limited thereby.

EXAMPLE

The oxidation reactor is operated at a salt inlet temperature of 843° F and a pressure of 76 psia.

The dechlorination reactor is operated at a salt inlet temperature of 950° F and pressure of 13.7 psia.

TABLE

| STREAM COMPONENT | 10 mph | 11 mph | 12 mph | 16 mph | 17 mph | 18 mph | 19 mph | 26 mph | 29 mph |
|---|---|---|---|---|---|---|---|---|---|
| $O_2$ | 305.5 | | 140 | | | | 158.6 | | 19.9 |
| $N_2$ | 6.3 | | 44 | | | | 50.3 | | 6.3 |
| HCl | | 1,174 | | | | | 25 | 51.5 | 26.5 |
| $Cl_2$ | | | 283 | | | | | 6.2 | 0.8 |
| $H_2O$ | | | | | | 541 | 1114.8 | 570.3 | 0.4 |
| KCl | | | | 7,853 | 7,853 | | | | |
| CuCl | | | | 7,241 | 5,538 | | | | |
| $CuCl_2$ | | | | 9,792 | 11,495 | | | | |
| $LaCl_3$ | | | | 1,308 | 1,308 | | | | |
| TOTAL | 311.8 | 1,174 | 467 | 26,194 | 26,194 | 566 | 1,381.4 | 596.8 | 27.4 |

TABLE

| STREAM COMPONENT | 31 mph | 32 mph | 43 mph | 41 mph | 53 mph | 52 mph | 58 mph | 61 mph | 68 mph |
|---|---|---|---|---|---|---|---|---|---|
| $O_2$ | 138.7 | 27 | 165.7 | | 165.7 | | 165.7 | 165.7 | |
| $N_2$ | 44 | 8 | 52 | | 52 | | 52 | 52 | |
| HCl | | | 197 | 197 | 3.1 | 23.4 | | | |
| $Cl_2$ | 5.4 | 165 | 1021.8 | | 1021.8 | | 1021.6 | 1021.6s | 573.6 |
| $H_2O$ | 3.1 | | 1594.5 | 1591 | 358.3 | 215 | 25.7 | | |
| KCl | | | | | | | | | |
| CuCl | | | | | | | | | |
| $CuCl_2$ | | | | | | | | | |
| $LaCl_3$ | | | | | | | | | |
| TOTAL | 191.2 | 200 | 3031 | 1788 | 1600.9 | 238.4 | 1265 | 1239.3 | 573.6 |

The present invention is particularly advantageous in that it is possible to oxidize hydrogen chloride to chlorine at very high yields. In addition, it is possible to effect such oxidation of hydrogen chloride to chlorine in an overall process which provides for recovery of aqueous hydrogen chloride, as a by-product.

Numerous modifications and variations of the present invention are possible in light of the above teachings and, therefore, within the scope of the appended claims, the invention may be practiced otherwise than as particularly described.

What is claimed is:

1. A process for oxidizing hydrogen chloride to chlorine, comprising:
   contacting in a first reaction zone gaseous hydrogen chloride and an oxygen containing gas with a molten salt mixture containing cuprous and cupric chloride to enrich the cupric chloride content of the molten salt, said first reaction zone being operated at a pressure of from 1.1 to 10 atm., a molten salt inlet temperature of from 780° F to 880° F;
   introducing the molten salt enriched in cupric chloride withdrawn from the first reaction zone into a second reaction zone wherein gaseous chlorine is stripped from the molten salt by reducing the cupric chloride content thereof, the second reaction zone being operated at a pressure of from 0.1 to 2 atm., a molten salt inlet temperature of from 840° F to 1000° F, with the pressure of the first reaction zone being at least 1 atm. greater than the pressure in the second reaction zone and the molten salt inlet temperature to the second reaction zone being at least 60° F greater than the molten salt inlet temperature to the first reaction zone;

recovering a gaseous effluent containing chlorine from the second reaction zone; and passing molten salt from the second reaction zone to the first reaction zone.

2. The process of claim 1 wherein the cupric chloride to total copper mole ratio of the molten salt introduced into the first reaction zone is from 0.5:1 to 0.65:1 and the cupric chloride to total copper mole ratio of the molten salt introduced into the second reaction zone is from 0.65:1 to 0.73:1.

3. The process of claim 3 wherein the pressure in the first reaction zone is at from 3 to 5 atm. greater than the pressure in the second reaction zone and the molten salt inlet temperature to the second reaction zone is from 80° F to 120° F greater than the molten salt inlet temperature to the first reaction zone.

4. The process of claim 2 wherein the molten salt is circulated between the first and second reaction zones at a rate of from 1.5 to 5.0 tons of molten salt per lb.-mol of chlorine produced in the second reaction zone.

5. The process of claim 2 wherein the molten salt mixture further includes a chloride of a rare earth metal.

6. The process of claim 1 and further comprising:

withdrawing a gaseous effluent from the first reaction zone, containing oxygen, nitrogen, water vapor, chlorine and hydrogen chloride;

separating from the gaseous effluent water vapor and hydrogen chloride as aqueous hydrogen chloride; and subsequently introducing a portion of the gaseous effluent into the second reaction zone as a stripping gas to strip chlorine from the molten salt.

7. The process of claim 6 wherein the chlorine containing gaseous effluent withdrawn from the second reaction zone is employed to strip water from the aqueous hydrogen chloride separated from the gaseous effluent withdrawn from the first reaction zone.

8. The process of claim 7 wherein the aqueous hydrogen chloride subsequent to the stripping has a hydrogen chloride concentration of from 17 to 21%, by weight.

9. The process of claim 6 wherein chlorine is recovered from the chlorine containing gaseous effluent by cooling thereof to condense chlorine.

10. The process of claim 9 wherein oxygen is stripped from the condensed chlorine and the stripped oxygen introduced into the first reaction zone.

11. The process of claim 1 wherein the first reaction zone is operated at a pressure of from 4 to 6 atm and the second reaction zone at a pressure of from 1 to 1.5 atm.

12. The process of claim 1 wherein a stripping gas is introduced into the second reaction zone to strip chlorine from the molten salt.

* * * * *